United States Patent
Rajwan et al.

(10) Patent No.: US 11,822,399 B2
(45) Date of Patent: Nov. 21, 2023

(54) TEMPERATURE CONTROL LOOP FOR INTEGRATED CIRCUIT

(71) Applicant: Apple Inc., Cupertino, CA (US)

(72) Inventors: Doron Rajwan, Rishon LeZion (IL); Tal Kuzi, Herzliya (IL); Keith Cox, Sunnyvale, CA (US); Yizhang Yang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 159 days.

(21) Appl. No.: 17/387,376

(22) Filed: Jul. 28, 2021

(65) Prior Publication Data

US 2023/0031415 A1  Feb. 2, 2023

(51) Int. Cl.
  *G06F 1/20*  (2006.01)
  *G06F 11/30*  (2006.01)
  *G06F 1/08*  (2006.01)

(52) U.S. Cl.
  CPC ............ *G06F 1/206* (2013.01); *G06F 1/08* (2013.01); *G06F 11/3058* (2013.01)

(58) Field of Classification Search
  None
  See application file for complete search history.

(56) References Cited

U.S. PATENT DOCUMENTS

| | | | |
|---|---|---|---|
| 8,793,512 B2 | 7/2014 | Branover et al. | |
| 10,001,800 B1 * | 6/2018 | Takayanagi | G05F 3/02 |
| 10,401,235 B2 | 9/2019 | Coutts et al. | |
| 10,586,791 B2 | 3/2020 | Ma et al. | |
| 2013/0076381 A1 * | 3/2013 | Takayanagi | G01K 3/005 |
| | | | 374/1 |
| 2013/0246820 A1 * | 9/2013 | Branover | G06F 1/206 |
| | | | 713/320 |
| 2014/0365793 A1 * | 12/2014 | Cox | G06F 1/3203 |
| | | | 713/320 |
| 2018/0073933 A1 * | 3/2018 | Keskin | G06F 1/206 |

FOREIGN PATENT DOCUMENTS

EP        3152636 B1 *  9/2017  ............ G06F 1/08

* cited by examiner

*Primary Examiner* — Isaac Tuku Tecklu
(74) *Attorney, Agent, or Firm* — Kowert, Hood, Munyon, Rankin & Goetzel, P.C.; Erik A. Heter; Dean M. Munyon

(57) ABSTRACT

A temperature control apparatus is disclosed. An integrated circuit (IC) includes a plurality of temperature sensors, a first thermal control loop, and a second thermal control loop. The first thermal control loop is configured to control temperature of the IC by reducing a frequency of a clock signal provided to the IC in response to a temperature at one of the plurality of temperature sensors reaching a first temperature threshold. The second thermal control loop is configured to control temperature of the IC by dithering the clock signal provided to the IC in response to a temperature at one of the plurality of temperature sensors reaching a second temperature threshold that is greater than the first temperature threshold.

20 Claims, 11 Drawing Sheets

TEMPERATURE CONTROL LOOP FOR INTEGRATED CIRCUIT

BACKGROUND

Technical Field

This disclosure is directed to integrated circuits, and more particularly, thermal control mechanisms for integrated circuits.

Description of the Related Art

Controlling the temperature of an operating integrated circuit (IC) is important to prevent thermal runaway which can damage various devices implemented in silicon. Various mechanisms are utilized to control the temperature of an IC during operation. Many ICs include a number of temperature sensors implemented at various points on an IC die. These temperature sensors report temperature readings to a temperature controller. The readings may be used by the temperature controller to carry out temperature control actions to maintain the temperature of the IC within safe limits, or suspend operation should the temperature of the IC exceed prescribed limits.

SUMMARY

A temperature control apparatus is disclosed. In one embodiment, an IC includes a plurality of temperature sensors, a first thermal control loop, and a second thermal control loop. The first thermal control loop is configured to control temperature of the IC by reducing a frequency of a clock signal provided to the IC in response to a temperature at one of the plurality of temperature sensors reaching a first temperature threshold. The second thermal control loop is configured to control temperature of the IC by dithering the clock signal provided to the IC in response to a temperature at one of the plurality of temperature sensors reaching a second temperature threshold that is greater than the first temperature threshold.

In one embodiment, the first temperature threshold includes a temperature value and a guardband. The guardband is determined based on a temperature detected at a particular one of the plurality of temperature sensors and a temperature at a designated hotspot on the integrated circuit during operation in a designated normal workload condition. The designated normal workload condition may be a maximum expected workload for the IC under otherwise normal conditions. This may enable a smaller guardband and thus allow for increased performance of the IC.

The second thermal control loop is further configured to detect voltage droops in a supply voltage provided to various circuits in an IC. In response to detecting a voltage droop, the second control loop may cause gating (inhibiting) of the clock signal. Voltage droops can be caused by an increased current demand as a result of an increased workload of an IC (or portion thereof). The increased workload can result in a significant amount of heat. Accordingly, the ability to detect and respond to supply voltage droops provides another mechanism for on-chip thermal control.

BRIEF DESCRIPTION OF THE DRAWINGS

The following detailed description makes reference to the accompanying drawings, which are now briefly described.

DETAILED DESCRIPTION OF EMBODIMENTS

Figure 1:
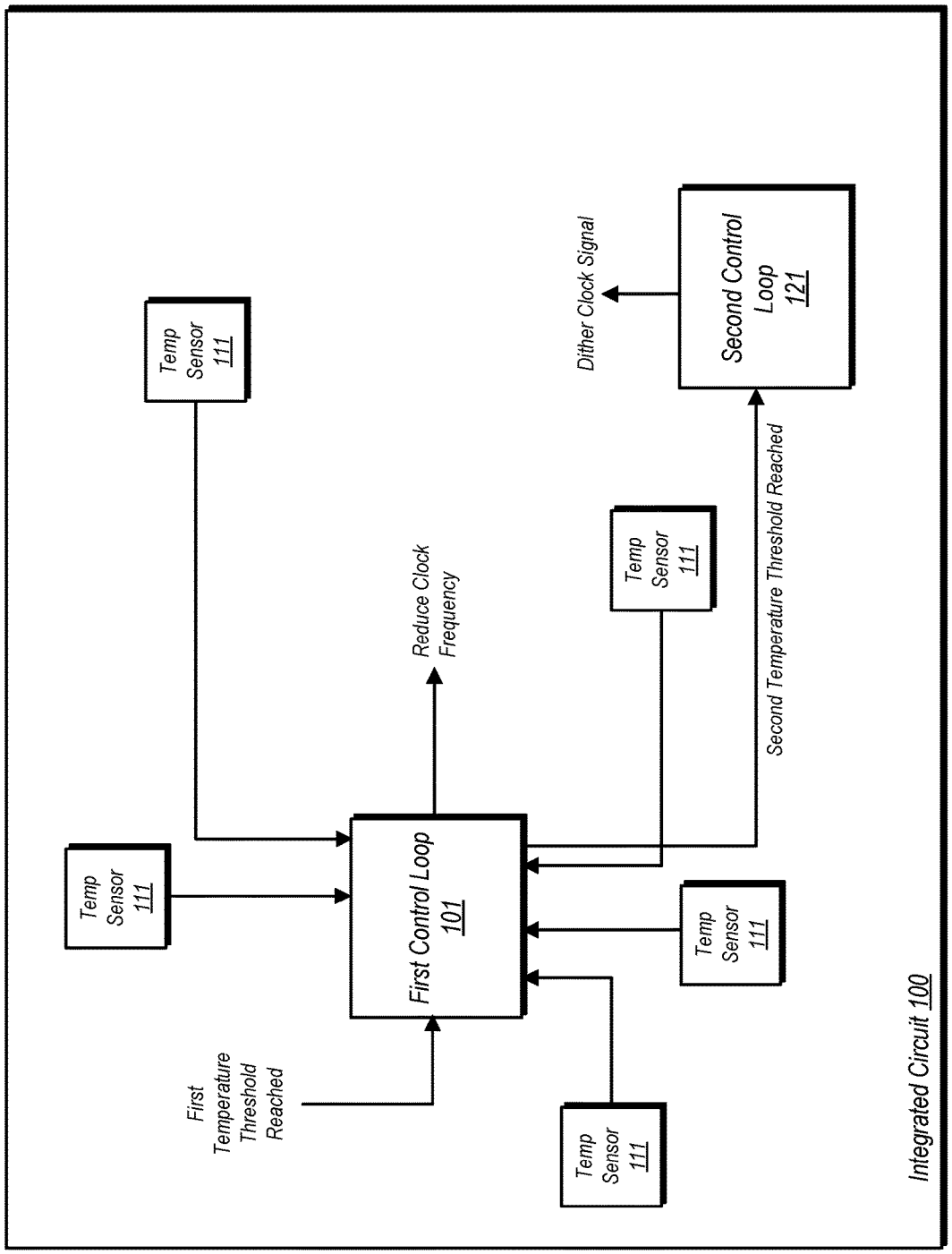
FIG. 1 is a block diagram of one embodiment of a thermal control system for an integrated circuit.

The present disclosure is directed to a thermal control system for an IC. As IC feature sizes have become smaller, the number of devices on a single die has increased. The larger number of devices results in a larger thermal output for many ICs. Accordingly, the demands on thermal control systems within ICs have increased in order to prevent damage to ICs as well as to control energy consumption.

Many thermal control systems include a number of temperature sensors placed at various locations around an IC die. These sensors detect the local temperature and report it to control circuitry that compares the temperature to various temperature thresholds and performs various temperature control actions. Such temperature control actions may include lowering a clock frequency, gating a clock signal to suspend operation for a time, reducing supply voltages provided to various circuits, and re-allocation of workloads, among others.

Temperature thresholds used in a thermal control system may be based on guardbands that represent a difference between an actual threshold value and a sensed temperature that is determined to meet the threshold. For example, a difference of 10° C. may be used as a guardband, with the thermal control system determining that the threshold has been reached when a temperature that is 10° F. less than the actual threshold is reported. Among the reasons a guardband are applied is that the location of temperature sensors may be different from where a large amount of heat is generated (the latter often referred to as a "hotspot"). The determination of a particular guardband is often times based on a worst case scenario, such as the execution of malicious code that is designed to cause the generation of heat for the express purpose of damaging or causing a shutdown of an IC (e.g., a power virus).

The present disclosure is directed to a thermal control system having multiple thermal control loops. A first thermal control loop in one embodiment includes a number of temperature sensors and control circuitry that compares reported temperatures to various thresholds and performs control actions based on these comparisons. For example, when a first threshold is determined to be met or exceeded, the first control loop may cause a reduction of the frequency of a clock signal provided to circuitry associated with a particular hotspot. A second thermal control loop may perform temperature control actions based on indications received from the first thermal control loop (e.g., dithering a clock signal in response to temperature exceeding a second threshold greater than the first) as well as through various indirect mechanisms. For example, the second thermal control loop may detect voltage droops in a supply voltage. A voltage droop is often associated with a significant amount of switching activity that can generate heat on an IC. In response to detecting a voltage droop, the second control loop may, for example, gate the clock signal for some time (which can be pre-determined or variable and dependent on operating conditions), effectively suspending operation for the amount of time the clock is gated. With respect to controlling the temperature of the IC, gating the clock signal in this manner may prevent the temperature on the IC from exceeding a threshold at which the first thermal control loop would take temperature control actions, in addition to allowing the supply voltage to recover to within specified limits. Accordingly, the second thermal control loop provides a backup for the first thermal control loop, and may in some cases prevent certain thresholds from being reached by performing actions that control the temperature that are not directly based on readings from temperature sensors.

In one embodiment, an IC includes a plurality of temperature sensors and a first thermal control loop configured to control temperature of the IC by performing dynamic voltage and frequency management (DVFM) in response to a temperature at one of the plurality of temperature sensors reaching a first temperature threshold. A second thermal control loop is configured to control temperature of the IC by dithering the clock signal provided to the IC in response to a temperature at one of the plurality of temperature sensors reaching a second temperature threshold that is greater than the first temperature threshold.

In another embodiment, an IC includes a plurality of temperature sensors. A first thermal control loop is configured to operate in a first mode to control temperature of the IC by reducing a frequency of a clock signal provided to the IC in response to a temperature at one of the plurality of temperature sensors meeting a first temperature threshold. A second thermal control loop is configured to operate in a second mode to control temperature of the IC by dithering a clock signal provided to the IC in response to a temperature at one of the plurality of temperature sensors meeting a second temperature threshold that is greater than the first temperature threshold. The IC uses less power in the first mode than in the second mode.

In various ones of the embodiments described in the previous paragraphs, some temperature guardbands may be reduced. In one embodiment, instead of basing the guardband on a worst-case scenario, it is instead based on a maximum expected normal workload. An expected normal workload is defined herein as a workload or other portion of non-malicious code that would be expected and intended to be performed by the system in which the IC is implemented, e.g., a software application/program or portion thereof that is installed on the system by a user or the manufacturer. A maximum workload is defined herein as a workload expected to demand a higher performance of the system than other normal workloads. By utilizing the maximum expected normal workload as the basis for the guardband, a smaller guardband may be used and thus additional performance is possible relative to systems in which the worst case scenario is the basis for the guardband. In various embodiments, the use of the smaller guardband is enabled by the use of the second thermal control loop and its ability to take various actions to control the temperature of the IC using mechanisms that include those that do not directly depend on temperature (e.g., actions to remedy voltage droops).

The description below begins with discussions of various embodiments of a thermal control system having first and second control loops. Thereafter, a description is provided of various thresholds and guardbands that may be used in different embodiments of a thermal control system. Examples of the first and second control loops are also described. The discussion continues with descriptions of various methods utilized in implementing and operating a thermal control system in accordance with this disclosure. The discussion concludes with the description of an example system in which an embodiment of the thermal control system may be implemented.

Thermal Control System with Multiple Thermal Control Loops:

FIG. 1 is a block diagram of one embodiment of an IC having a thermal control system that includes first and second thermal control loops. In the embodiment shown, IC 100 includes a plurality of temperature sensors 111. The temperature sensors 111 may be implemented using various types of temperature sensor circuit topologies. For example, one embodiment may utilize ΔVbe-type temperature sensors based on bandgap circuitry utilizing bipolar transistors, while another embodiment may utilize ring oscillators as temperature sensors.

A first control loop 101 in the embodiment shown is a thermal control loop coupled to the various ones of the temperature sensors 111 and configured to receive temperature readings therefrom. In response to an indication that a first temperature threshold has been reached (which may be provided by one or more of the various temperature sensors 111), the first control loop may perform a temperature control action by reducing the frequency of the clock signal. In one embodiment, a reduction of the frequency of the clock signal may include maintaining the duty cycle of the clock signal. For example, if the clock signal is operating at 2 GHz with a 50% duty cycle prior to the reduction, the frequency of the clock signal following the reduction may be 1 GHz with a 50% duty cycle.

IC 100 in the embodiment shown also includes a second control loop 121, which is also a thermal control loop. As shown in FIG. 1, second control loop 121 is coupled to receive an indication, from first control loop 101, that a second temperature threshold has been reached. In response receiving this indication, second control loop 121 performs dithering of the clock signal. Dithering of the clock signal involves a reduction of its frequency. However, as opposed to the frequency reduction performed by first control loop 101, dithering as defined herein results in a reduction of the duty cycle. This may be accomplished by inhibiting, or "swallowing" some clock pulses. For example, consider a clock signal operating at 2 GHz with a 50% duty cycle prior to dithering. By inhibiting three of every four clock pulses, the duty cycle may fall to 12.5%, while the effective frequency becomes 500 MHz. It is noted that the numbers given in the examples of frequency reduction and dithering are for illustrative purposes only, and are not intended to limit the disclosure in any way.

Dithering is one example of a temperature control action that may be carried out by the second control loop 121. Similarly, frequency reduction is but one possible temperature control action that may be carried out by first control loop 101. Other control actions are possible and contemplated, some of which will be discussed below. Additionally, second control loop 121 may receive control inputs from other sources, some of which are not necessarily a direct reflection of a current temperature on the IC but can nevertheless be useful managing thermal output of the IC die.

Figure 2:
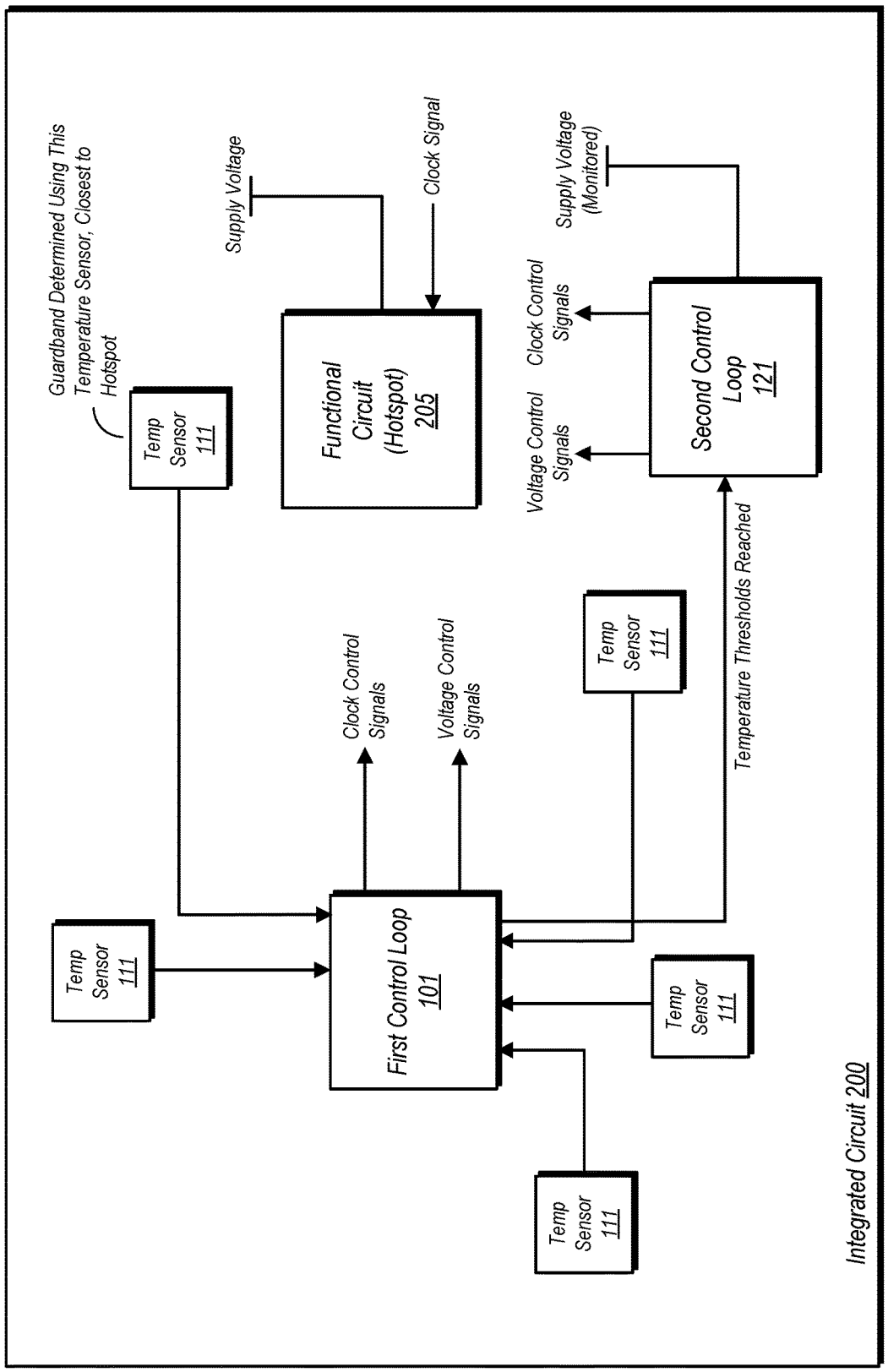
FIG. 2 is a block diagram of another embodiment of a thermal control system for an integrated circuit.

FIG. 2 is another embodiment of an IC having first and second thermal control loops. In the embodiment shown, IC 200 includes a functional circuit 205, which may represent a hotspot on the die. The functional circuit 205 may be one of a number of different types of circuitry, such as an execution unit of a general purpose processor, a graphics processing unit, and so on. The circuit may be designated as a hotspot due to its operations generating a larger amount of heat relative to at least some other circuits on IC 200. Functional circuit 200 as shown here is configured to receive a supply voltage and a clock signal, both of which are controllable for various reasons, including thermal control.

IC die 200 as shown includes a first control loop 101 configured to receive temperature readings from ones of temperature sensors 111. One of the temperature sensors 111 as illustrated in FIG. 2 is physically closer to functional circuit 205 than the other sensors. This particular temperature sensor 111 may form the basis upon which a guardband is determined, which is discussed in further detail below.

In response to reported temperatures meeting or exceeding various thresholds, first control loop 101 may generate clock control signals and/or voltage control signals. The clock control signals may be used to control a frequency of the clock signal provided to the functional circuit 205. For example, the clock control signals may be used to reduce the frequency of the clock signal in response to determining that a reported temperature has exceeded a particular threshold value. In another example, when the temperature is less than the particular threshold value and there is a higher performance demand on functional circuit 205, the first control loop 101 may generate clock control signals to cause the frequency of the clock signal to be increased. First control loop 101 may also respond similarly with regard to the voltage control signals, which may be used to control a value of the supply voltage provided to functional circuit 205. Higher values of the supply voltage may be commensurate with higher performance states, while lower values of the supply voltage may correspond to either reduced performance states or actions taken to maintain the temperature of functional circuit 205 within prescribed limits.

Second control loop 121 in the embodiment shown is also configured to generate clock control and voltage control signals, and may do so for similar reasons. As shown here, second control loop 121 is configured to receive indications from first control loop 101 that one or more temperature thresholds have been reached or exceeded. In one embodiment, the second control loop 121 generates clock control signals to cause a clock signal to be dithered in response to receiving an indication from first control loop 101 that a particular temperature threshold has been exceeded.

In the embodiment shown, second control loop 121 is also configured to monitor the supply voltage that is provided to functional circuit 205. It is noted that circuitry implementing second control loop 121 may operate using a different supply voltage than that used by functional circuit 205. The monitored supply voltage is used as another control input to second control loop 121. Among the functions performed by second control loop 121 is to perform actions to correct voltage droops. A voltage droop is defined herein as a drop in the supply voltage below specified limits for at least some specific amount of time (e.g., a specified time exceeding the setup and hold time of a particular timed circuit, a period of a full clock cycle, etc.). For example, if the supply voltage is 1.0 volts with a tolerance of ±5%, an unplanned drop of the supply voltage to 0.7 volts for some specified amount of time thus falls within the definition of a voltage droop in accordance with this disclosure. A voltage droop may be caused by a sudden rise and/or sustained amount of switching activity that increases the current demanded by the load circuit beyond the ability of the corresponding power supply to satisfy this demand or to respond quickly enough to its increase. While these conditions can also cause an increase in temperature in the load circuits, the voltage droop will typically occur first. Accordingly, by taking action to respond to the voltage droop, the second control loop 121 may prevent a corresponding rise in temperature, even though a temperature exceeding a threshold that would trigger a temperature control action has not otherwise been reported. In one embodiment, the second control loop 121 may respond to a voltage droop by inhibiting the clock signal altogether for some amount of time, effectively suspending operation of the load circuit until the power supply has had sufficient time to recover. Inhibiting the clock signal in this manner is sometimes referred to in the art as "throttling."

In addition to generating the clock control signals, second control loop 121 may also generate voltage control signals to control a level of the supply voltage. This may include reducing the supply voltage as a thermal control action or in response to a transition of functional circuit 205 to a lower performance state (e.g., when the workload demand has decreased). The second control loop 121 can also, in various embodiments, cause the supply voltage to be increased via the voltage control signals, e.g., in response to a transition to a higher performance state.

Figure 3:
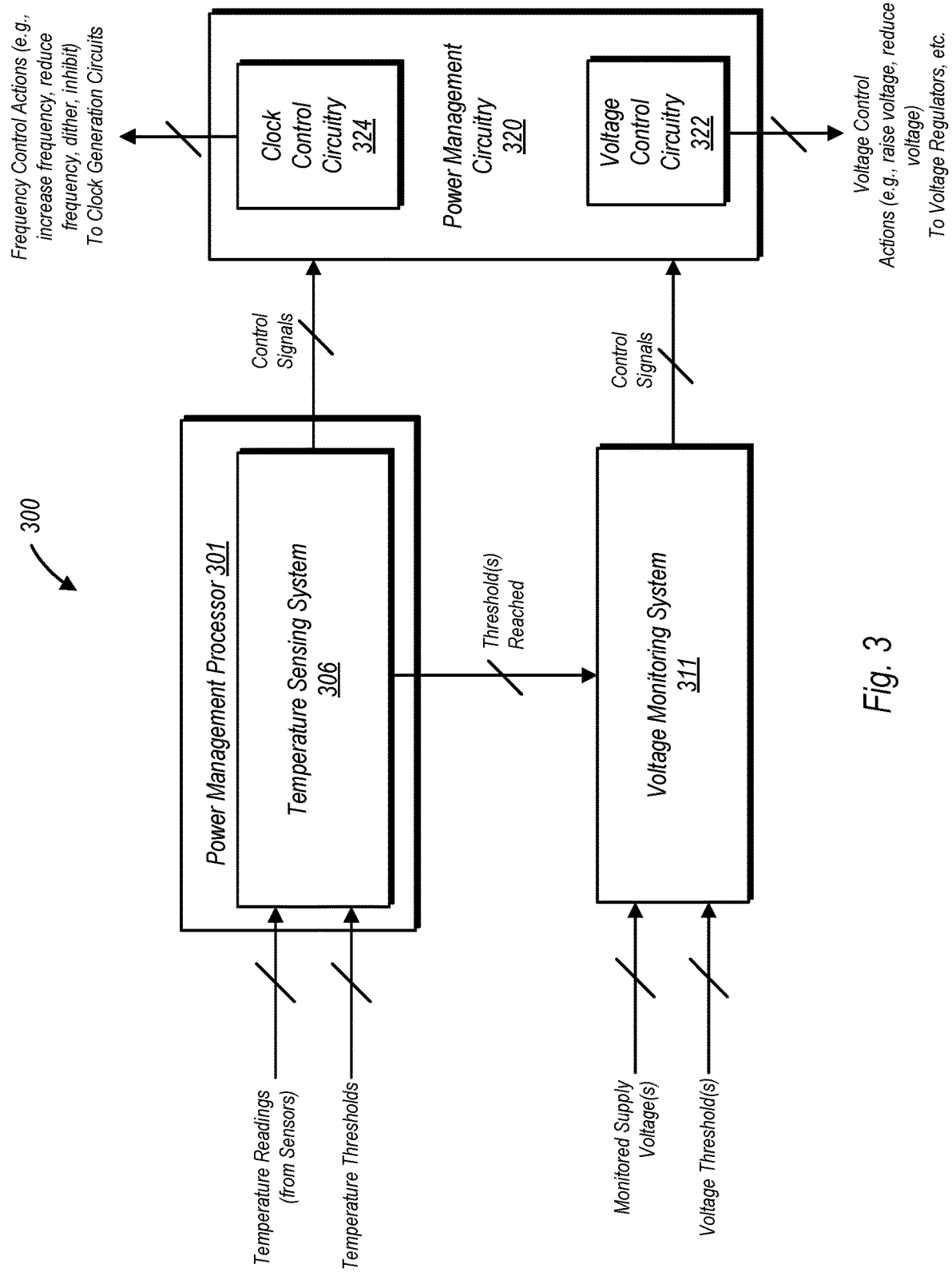
FIG. 3 is a block diagram of another embodiment of a thermal control system for an integrated circuit.

FIG. 3 is a block diagram of another embodiment of a thermal control system. In the embodiment shown, thermal control system 300 includes a power management processor 301. The power management processor 301 includes a temperature sensing system 306. Power management processor 301 and temperature sensing system 306 form a first thermal control loop, and are configured to generate a first set of control signals. Thermal control system 300 also includes a voltage monitoring system 311, which forms a second thermal control loop and which is configured to generate a second group of control signals. Both power management processor 301 and voltage monitoring system 311 are coupled to power management circuitry 320, which includes voltage control circuitry 322 and clock control circuitry 324.

The voltage control circuitry 322 in the embodiment shown may perform various voltage control actions on correspondingly coupled power circuits, e.g., voltage regulators. This may include increasing or reducing the voltage in response to control signals from either power management processor 301 or voltage monitoring system 311, as well as from other inputs. Voltage control circuitry 322 may also cause power supply circuitry to be shut down in some instances. For example, if all circuitry powered by a particular power supply is placed in a sleep mode, voltage control circuitry 322 may generate signals to power down that power supply in order to conserve power.

Clock control circuitry 324 in the embodiment shown may perform various frequency control functions on the various on-chip clock signals. Some of these functions may be performed based on control signals received from either power management processor 301 or voltage monitoring system 311. The various clock control functions that may be carried out by clock control circuitry 324 include raising a clock frequency, reducing a clock frequency, dithering the clock signal, and inhibiting a clock signal. In some embodiments, the clock control circuitry may shut down a source of a clock signal, e.g., when its corresponding clock consumers (functional circuits) are placed in a sleep mode. Clock control circuitry 324 may, in various embodiments, include frequency multipliers, frequency dividers, and clock gating circuits. In other embodiments, these circuits may be located elsewhere, with clock control circuitry 324 generating commands (through the various frequency control action signals) that cause these functions to be carried out.

Temperature sensing system 306 in the embodiment shown may carry out the actions of a first thermal control loop in accordance with the embodiments discussed above. In some embodiments, temperature sensing system 306 may be implemented using dedicated, hardwired circuitry. In other embodiments, temperature sensing system 306 may be implemented, at least in part, by software or firmware instructions that execute on other circuits within power management processor 301. Embodiments where temperature sensing system 306 is implemented using a field programmable gate array (FPGA) within power management processor 301 are also possible and contemplated. In the illustrated embodiment, temperature sensing system 306 may carry out temperature control actions using temperature readings (from temperature sensors) and temperature thresholds as control inputs. Temperature sensing system 306 may be considered to be a feedback control system, with the feedback provided in the form of the temperature readings and the temperature thresholds acting as the various references. Based on comparing temperature readings with the various thresholds, temperature sensing system 306 may generate control outputs in the form of the control signals provided to power management circuitry 320 as well as the Threshold(s) Reached signal (s) provided to voltage monitoring system 311.

Voltage monitoring system 311 in the embodiment shown is configured to receive monitored supply voltages and various voltage thresholds, along with the Threshold(s) Reached signal(s) as control inputs. Similar to temperature sensing system 306, voltage monitoring system 311 operates as a feedback control system, with the various monitored supply voltages providing the feedback and the voltage thresholds providing the reference inputs. The Threshold(s) Reached signal(s) in this case present a special case of feedback in which voltage monitoring system 311 performs a control action based on feedback received by temperature sensing system 306. In one embodiment, in response to receiving a signal from temperature sensing system 306 indicating a temperature has reached a particular threshold, voltage monitoring system 311 may generate control signals that cause clock control circuitry 324 to dither a clock signal. In another example, if the temperature sensing system 306 provides an indication that a maximum safe threshold has been reached, voltage monitoring system 311 may initiate a reset or a shutdown of the IC.

In addition to the above, voltage monitoring system 311 in the embodiment shown is configured to perform various voltage control actions. Among these voltage control actions are responding to voltage droops in which a monitored supply voltage falls below prescribed tolerances for a particular amount of time. This may occur, for example, when there is a rapid increase in switching activity in a functional circuit receiving the supply voltage, with a corresponding increase in current demand from the power supply circuitry from which the supply voltage is generated. In response to detecting a voltage droop, the voltage monitoring system 311 may take various actions. In some instances, voltage monitoring system 311 may perform clock gating to enable the power supply to recover the supply voltage to within prescribed limits. In some less severe cases, voltage monitoring system 311 may perform clock dithering to reduce the effective frequency of the clock signal at least until the time that the supply voltage has recovered. Voltage monitoring system 311 may also perform a combination of these actions, e.g., inhibiting the clock signal for a time and dithering the clock signal upon resumption of operation. Alternatively, voltage monitoring system 311 may inhibit the clock signal until the supply voltage has recovered and subsequently cause the clock signal to restart at a reduced frequency.

Voltage monitoring system 311 can also cause a reduction in the performance state of the functional circuit receiving the supply voltage, with the reduction in performance state including a reduction in operating voltage. For example, if a functional circuit is operating in a high performance state with a supply voltage V1 and a clock frequency F1 at the time a droop is detected, voltage monitoring system 311 may cause operation to resume, after recovery from the droop, at a supply voltage V2 (where V1>V2) and a clock frequency of F2 (where F1>F2).

As previously noted, the various voltage control actions carried out by voltage monitoring system 311, such as recovery from voltage droops, may have the beneficial effect of preventing rises in temperature that accompany rapid or sustained increases in activity within a functional circuit. Thus, voltage monitoring system 311 may, by preventing the rise of on-chip temperatures in at least some cases, provides another mechanism for controlling the temperature and protecting the IC from overheating.

Figure 4:
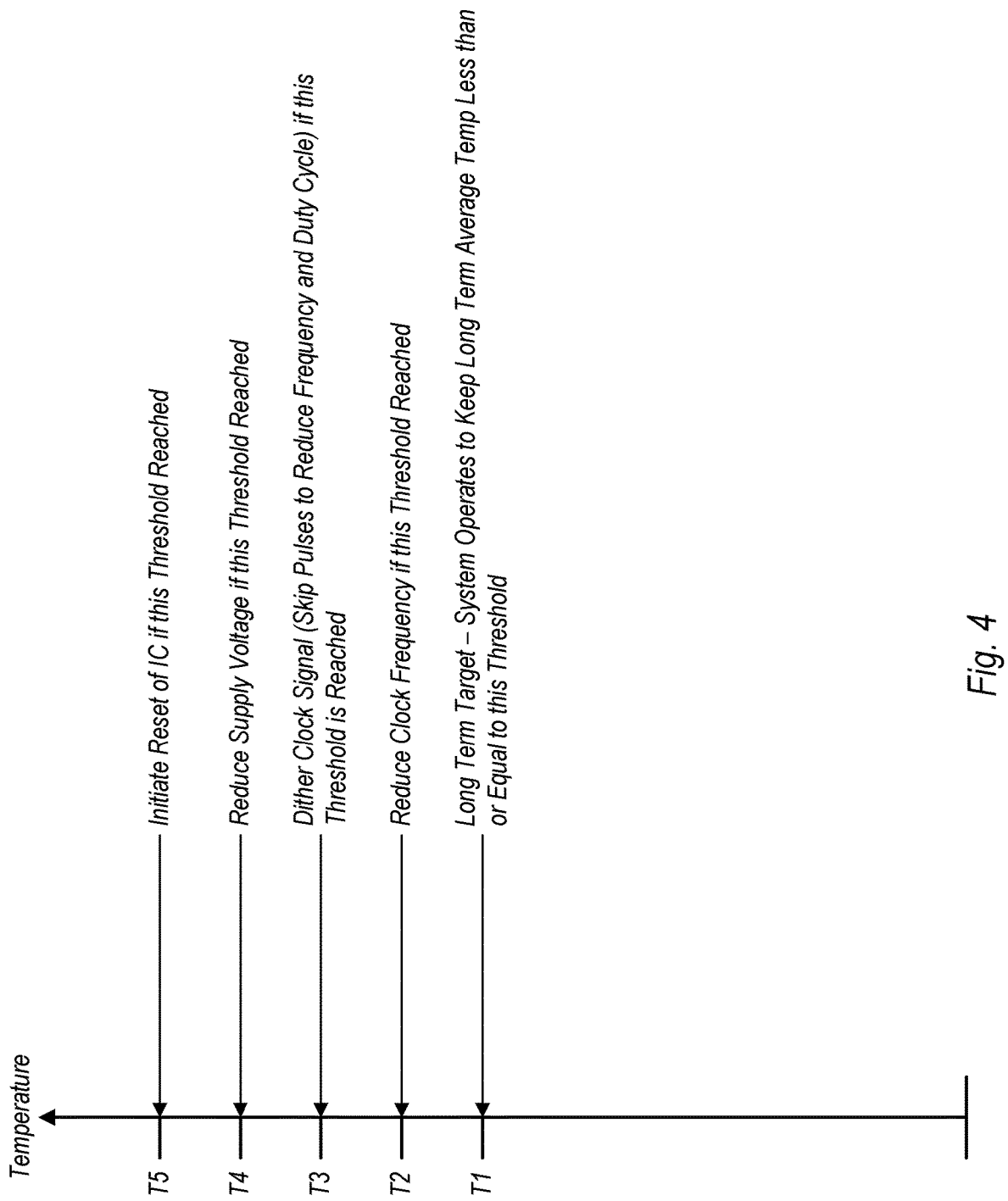
FIG. 4 is a diagram illustrating temperature thresholds used by one embodiment of a thermal control system.

Threshold and Guardband Examples for Embodiment of a Thermal Control System:

FIG. 4 is a diagram illustrating different temperature thresholds used in one embodiment of a thermal control system, along with corresponding temperature control actions. It is noted that this figure is intended to be illustrative, and thus is not intended to limit the disclosure. Embodiments of a thermal control system using a different number of thresholds and performing different temperature control actions when these thresholds are reached are possible and contemplated.

In the illustrated example, temperature T1 is a first threshold that represents a long term average target temperature. As will be discussed below, various embodiments of the thermal control system may be configured in such a manner to not only react to a current temperature value, but to also maintain the temperature to being less than or equal to the long term average. Thus, while the temperature may be permitted to be above this threshold for some amount of time, various embodiments of the thermal control system may take action to maintain the long term average temperature at or below this threshold, and may thus take temperature control actions to do so even if another threshold has not been reached. Maintaining the long term average temperature below this threshold may reduce wear on the IC.

At threshold T2, which is greater than threshold T1, a temperature control action of clock frequency reduction is performed. This reduction in frequency may include maintaining the duty cycle of the clock signal. For example, a clock signal operating at 2 GHz with a 50% duty cycle may be reduced to 1 GHz with a 50% duty cycle in response to a reported temperature reaching or exceeding this threshold.

At threshold T3, which is greater than threshold T2, the clock frequency is dithered. This is accomplished by inhibiting pulses of a clock signal to reduce its duty cycle and its effective frequency. With a reduced duty cycle, the clock signal has a longer "off" time. This longer off time may in turn reduce heat generation and thereby give the IC a chance to recover the temperature to a value lower than a threshold at which a temperature control action is taken.

At threshold T4, which is greater than threshold T3, the supply voltage is reduced. In combination with the dithering performed upon reaching threshold T3, the reduction in operating voltage may further reduce heat generation in an effort to bring the temperature back to within desired limits.

At threshold T5, which is greater than threshold T4, a reset of the IC may be initiated in response to a temperature of this value. Alternatively, embodiments are possible and contemplated wherein a shutdown of the IC is initiated when this threshold is reached. The temperature reported at this threshold indicates that the previously taken temperature control actions have not been successful and thus stronger measures are to be performed in order to prevent the potential of damage to the IC.

Figure 5:
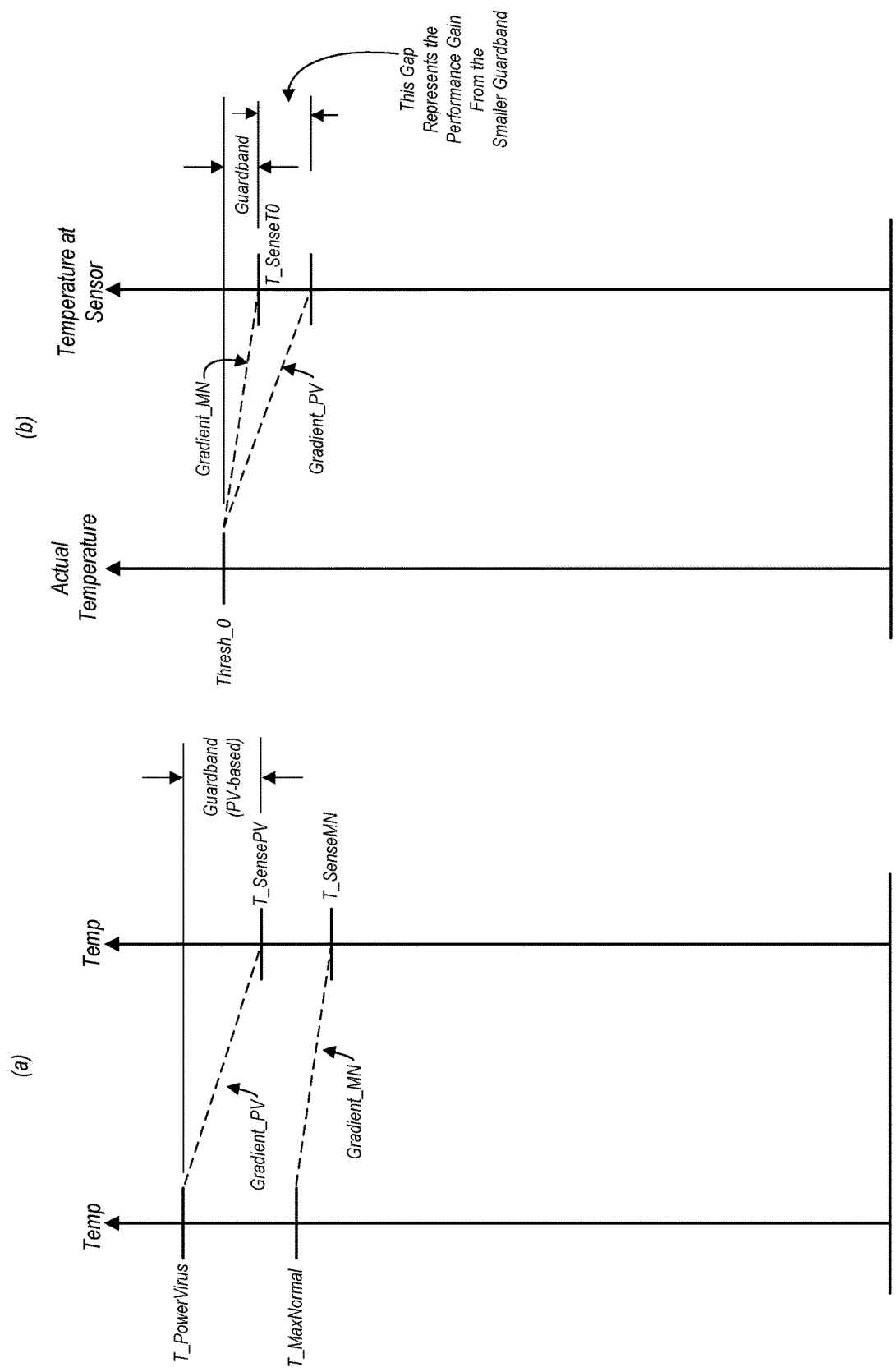
FIG. 5 is a diagram illustrating one embodiment of a methodology for determining a guardband in a thermal control system.

FIG. 5 is a diagram illustrating the determination of a guardband for various embodiments of a thermal control system in accordance with this disclosure. On the left-hand side of the drawing, under (a), a comparison of temperature gradients is shown between the case in which a guardband is determined based on malicious code known as a power virus, and a maximum normal expected workload. A power virus is defined herein as malicious software code that is written and designed for the express purpose of causing processing circuitry to overheat. A maximum normal expected workload, as defined above, is non-malicious code from an application or software (e.g., from an app store for a smartphone manufacturer) that has a higher expected performance demand relative to other applications.

As shown in (a), the actual power virus temperature, T_PowerVirus may be detected by a particular temperature T_SensePV, using a guardband based on a gradient labeled here as Gradient_PV. The gradient may be based on a difference in the actual temperature at the location of the hotspot on the IC where T_PowerVirus occurs and the temperature sensed at the location of the temperature sensor. A temperature of a maximum expected normal workload, T_MaxNormal, may be detected at the temperature sensor at a value of T_SenseMN, with the difference being shown as Gradient_MN. It is noted that the temperature sensor at which these temperatures are sensed is chosen to be one physically closest to the hotspot.

As can be seen in (a), the gradient based on the power virus scenario, Gradient_PV, is steeper than Gradient_MN, based on the maximum normal workload scenario. Accordingly, a guardband based on the former is larger than that based on the latter. Since the guardbands may be implemented for each of the various thresholds, the thermal control system will trigger temperature control actions earlier when using the guardband based on Gradient_PV. However, this can cost performance.

In (b), a scenario in which a guardband based on the maximum normal workload scenario is shown, along with a comparison to a hypothetical guardband based on the power virus scenario. As shown in (b), a threshold, Thresh_0, is provided as a temperature used to trigger a temperature control action by a thermal control system. The actual detected temperature at the sensor, T_SenseT0, is set based on the guardband using Gradient_MN instead of the worst case scenario of Gradient_PV. The gap between these two gradients is illustrated as indicating the potential performance gains from the smaller guardband. Accordingly, the control actions triggered by the actual sensed temperature reaching T_SenseT0 may occur later, and at a higher temperature, than if the guardband was based on Gradient_PV. More particularly, actions to reduce the frequency of the clock signal and/or the operating voltage may occur later in this particular scenario, since the functional circuitry is permitted to operate at the higher performance state (prior to any temperature control action) than in the scenario in which the guardband is based on Gradient_PV.

The insight behind using the smaller guardband is two-fold. First, the worst case scenario is considered to be less likely to occur than the maximum normal expected workload. While system software will typically allow a software application representing the maximum normal expect workload to execute, the system software includes security measures to prevent malicious code from executing. Second, as discussed elsewhere herein, the second thermal control loop, which monitors system supply voltage, provides an additional layer of thermal protection. Since a power virus typically results in a rapid and sustained increase in switching activity, it is thus likely to cause a voltage droop. This voltage droop may occur before the cumulative switching activity caused by the power virus has raised the temperature of the hotspot. The second control system, having the functionality of countering voltage droops, is configured to detect these droops and take corrective action and may thus perform these actions prior to the temperature of the hotspot reaching critical levels. Thus, based on this two-fold insight, the use of the smaller guardband may be deemed safe.

In various embodiments, the determination of the guardband may be determined by simulating operation of the IC. Such simulations may generate data indicating expected temperatures at various locations across the IC under various operating conditions. The simulations may include applying the maximum expected workload to a functional circuit (e.g., a processor core) that generates enough thermal output to be designated at a hotspot on the IC. These guardbands may then be implemented in the actual physical design of the IC.

Figure 6:
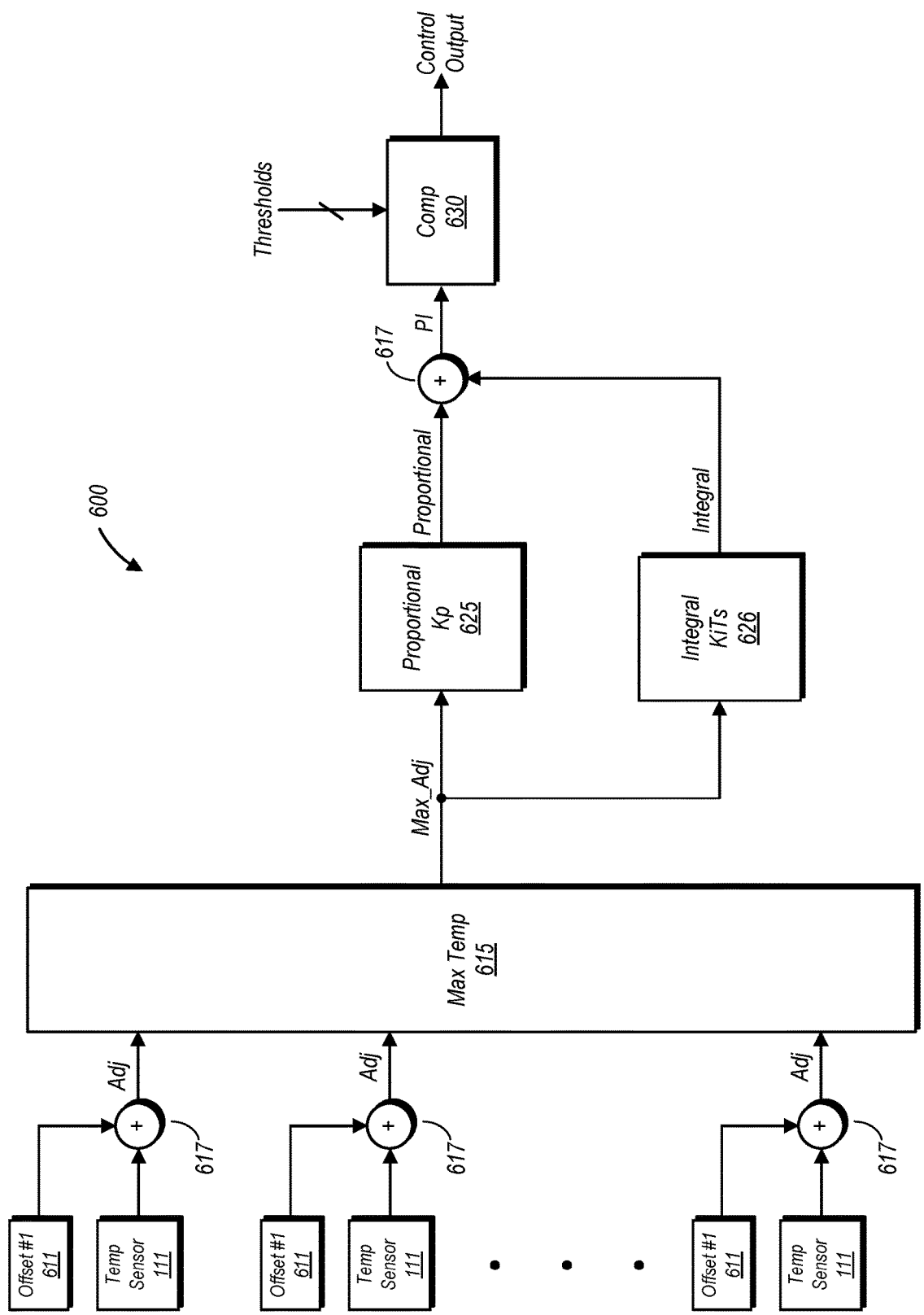
FIG. 6 is a diagram of one embodiment of a proportional-integral control loop implemented in an embodiment of a thermal control system.

Thermal Control Loop Examples:

FIG. 6 is a block diagram of one embodiment of a proportional-integral (PI) control loop implemented in an embodiment of a thermal control system. PI control loop 600 as shown here may be used to implement the first control loop, which is a feedback control system. The control output may be provided as various control signals, such as the clock and voltage control signals discussed above with reference to FIGS. 1-3. The feedback to PI control loop 600 may be provide in the form of temperatures sensed by various ones of a number of temperatures which indicate the current state of the system. It is noted that PI control loop 600 is discussed here in the terms of hardware blocks/circuits. However, embodiments where portions of PI control loop 600 are implemented using software, firmware, and/or hardware in any suitable combination are possible and contemplated by this disclosure. For example, the maximum temperature, proportional and integral units shown in FIG. 6 and discussed below may, in one embodiment, be implemented using instructions that execute on an embodiment of, e.g., power management processor 301 of FIG. 3, but can also be implemented in hardwired circuitry, an FPGA, or other suitable mechanism.

PI control loop 600 in the embodiment shown includes a number of temperature sensors 111. These sensors may be implemented using various types of temperature sensing circuits, including ring oscillators or ΔVbe bandgap circuits employing bipolar transistors. The respective temperatures sensed by the temperature sensors are provided as one input of a correspondingly coupled summing circuit 617. A second input to each of the summing circuits 617 shown here is an offset 611. The offset 611 may represent a guardband value, in accordance with the discussion of FIG. 5 above. The outputs of the summing circuits 617 represent sums of their corresponding inputs, the sums representing an adjusted sensed temperature (labeled "Adj").

The adjusted sensed temperatures are provided from the correspondingly coupled ones of summing circuit 617 to a maximum temperature circuit 615. This circuit performs a comparison operation among the adjusted sensed temperatures received and selects from these the maximum adjusted sensed temperature ("Max_Adj"). This value is then provided to both a proportional unit 625 and an integral unit 626. Proportional unit 625 in the embodiment shown applies a proportionality factor Kp to the maximum adjusted sensed temperature to generate a proportional error, and is responsive to a present state of the system as indicated by the maximum adjusted sensed temperature.

Integral unit 626 is responsive to the history of system responses. As noted above, various embodiments of a thermal control system operate to keep an average maximum temperature of the IC at or below a particular threshold, e.g., at or below T1 of FIG. 5. Thus, in response to receiving the current value of Max_Adj, integral unit 626 produces an integral response, or integral error KiTs, which is an integration over a specified time interval of the present response and some number of past responses. This results in an average maximum temperature over the specified time interval.

The proportional and integral responses are combined into the response "PI" by summing circuit 617, with this value being provided to comparator 630. Comparator 630 is also coupled to receive inputs corresponding to the various system thresholds. Using these thresholds, comparator 630 performs comparisons of the PI result input thereto. Based on these comparisons, comparator 630 generates a control output, which may comprise one or more signals to cause actions such as frequency reduction, voltage reduction, an indication to the second control loop to cause clock dithering, and so on.

It is noted that embodiments of a control loop including a derivative component, making controller 600 a PID controller, are also possible and contemplated. Using a derivative component, a corresponding embodiment may anticipate future states of the system based on the direction and rate of change of successive current states and factor that into the result provided to comparator 630.

Figure 7:
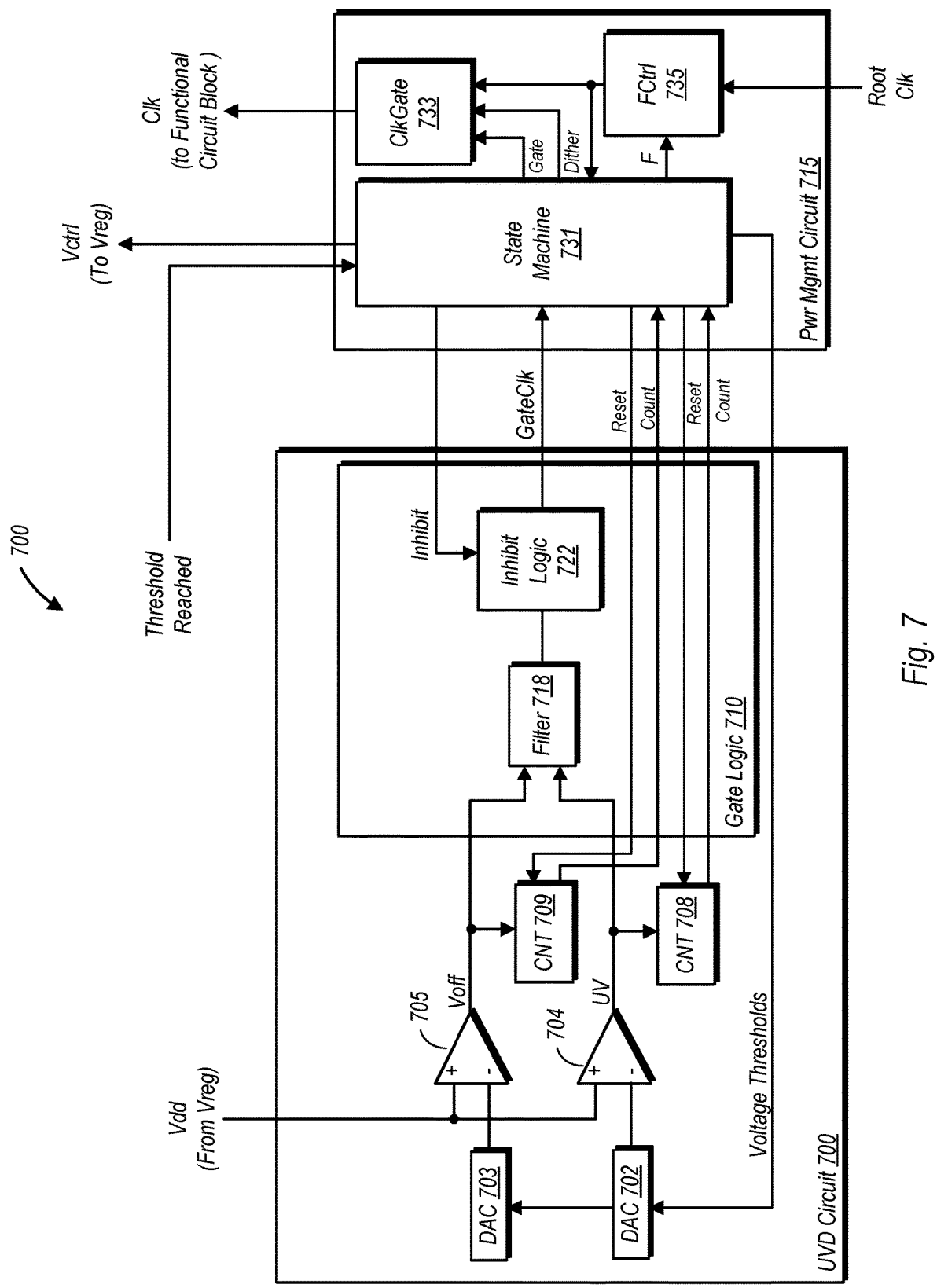
FIG. 7 is a block diagram of one embodiment of an under voltage protection system implemented as part of a thermal control system.

FIG. 7 is a diagram illustrating one embodiment of an under voltage detection circuit operated in conjunction with an embodiment of a power management circuit and as part of a thermal control system. UVD circuit 700 and the correspondingly coupled power management circuit 715 in the illustrated embodiment may be used to implement a second control loop that operates in conjunction with an embodiment of the first control loop, such as that discussed in reference to FIG. 6. Using UVD circuit 700, droops in a monitored supply voltage may be detected with corresponding actions taken to allow the source power supply to recover the supply voltage to a value within specified tolerances.

It is noted that UVD circuit 700 as shown here is configured to monitor a single supply voltage. However, as many ICs operate using a number of different supply voltages, multiple instances of this circuit and various embodiments thereof may be present within such an IC.

In the embodiment shown, UVD circuit 700 includes comparators 704 and 705, each of which is configured to compare the supply voltage, Vdd, to corresponding thresholds. Comparator 704 is coupled to receive a first threshold voltage from digital-to-analog converter (DAC) 702, while comparator 705 is coupled to receive a second threshold voltage from DAC 703. The voltage thresholds are provided to DACs 702 and 703 as digital values from state machine 731 in this particular embodiment.

If the supply voltage falls below the first voltage threshold, comparator 704 may assert the under voltage (UV) signal indicating the presence of an under voltage condition, or supply voltage droop. A supply voltage droop occurs when the supply voltage falls below a limit designated as a safe, lower operating limit, and more particularly, below a specified tolerance. For example, the lower tolerance limit may be defined as a lowest possible voltage at which the logic functions of an IC (or functional circuit thereof) may properly discern a logic 1 from a logic 0. The assertion of the UV signal may result in UVD circuit 700 asserting the clock gating signal (GateClk) provided to power management circuit 715, which may in turn cause gating of the clock signal for an amount of time to allow the supply voltage to recover.

If the clock gating signal is asserted, and comparator 705 detects that the supply voltage has risen above the second voltage threshold, a turnoff signal (Voff) may be asserted. When this signal is asserted, power management circuit 715 may de-assert the clock gating signal, thereby allowing a resumption of the clock signal provided to its various clock consumers. The second voltage threshold may also be used as an arming voltage to determine when assertion of the clock gating signal is to be enabled. For example, when transitioning to a performance state in which clock gating may be performed, assertion of the clock gating signal may be inhibited until the supply voltage has reached a value at least equal to the second voltage threshold, as indicated by the Voff signal. Assertion of the Voff signal may be used as an indication that the supply voltage has risen to a level that is at or above the second voltage threshold, after which assertion of the clock gating signal is no longer inhibited in the event of a droop below the first threshold voltage. This may prevent an inadvertent clock gating from occurring as the supply voltage is brought up to a level commensurate with the performance state being entered.

UVD circuit 700 also includes counters 708 and 709 which are coupled to the outputs of comparators 704 and 705, respectively. These counters may be used to record instances of the supply voltages crossing the voltage thresholds associated with their correspondingly coupled counters. In one embodiment, the counters may operate for a predetermined time period before being reset. If a counter indicates a crossing of a corresponding voltage threshold more than a certain number of times within the predetermined time period, power management circuit 715 may cause a change of performance state to a particular functional circuit block. For example, if operating in an accelerated performance state (i.e. the highest performance state in this embodiment), an indication of more than a certain number of crossings of the first voltage threshold may indicate that clock gating is occurring more often than desired. Responsive to making such a determination based on the count value from the first counter, power management circuit 715 may reduce the performance state of the particular functional circuit block to one having both a lower clock frequency and a lower operating voltage. Among other effects, this may reduce thermal output by the particular functional circuit block, thereby preventing overheating of the chip.

UVD circuit 700 also includes gating logic 710. Gating logic 710 includes a filter 718 and inhibit logic 722. The output signals UV and Voff from comparators 704 and 705, respectively, may be received by filter 718, which may be used to prevent transition of states of the clock gating signal resulting from transients occurring on the supply voltage node that are short in duration and otherwise negligible. For example, one embodiment may implement filter 718 as a low pass filter that passes only significant voltage droops but filters out transients of a very short duration (and thus comprise high frequency components). Such a filter may be implemented using digital or analog circuitry, depending on the particular embodiments. In another example, filter 718 may include a timer that is triggered in response to any assertion of the UV signal, and reset by a de-assertion of the same signal. If the timer is triggered by the UV signal but reset before reaching some specified amount of time, filter 718 may block the UV signal from reaching inhibit logic 722. The specified amount of time may be determined based on characteristics of the power supply from which Vdd is provided, and in particular, its transient response characteristics. Generally speaking, using filter 718 may allow the power supply a reasonable time to recover the supply voltage to within specified limits before beginning corrective action, and prevent corrective actions being taken for brief, transient drops below specified limits that the supply voltage may otherwise recover from without intervention.

Inhibit logic 722 is configured to control assertion of the clock gating signal in response to an output from filter 718. When operating in certain performance states, such as the high performance and accelerated performance states mentioned above, inhibit logic 722 may cause assertion of the clock gating signal when comparator 704 detects that the supply voltage is less than the first voltage threshold and remains so for a sufficient duration as to not be filtered out by filter 718. Similarly, when UVD circuit 700 is armed (i.e. the clock gating signal is enabled), inhibit logic 722 may cause de-assertion of an otherwise asserted clock gating signal responsive to comparator 705 detecting that the supply voltage has risen to at least the second voltage threshold. Inhibit logic 722 is also coupled to receive an inhibit signal from power management circuit 715 that may also cause inhibiting the assertion of the clock gating signal. This includes times when transitioning to or from a particular performance state.

Power management circuit 715 in the embodiment shown includes a state machine 731, a clock gating circuit 733, and a frequency control circuit 735. The frequency control circuit 735 may be used to set the frequency of the clock signal corresponding to the performance state at which a particular functional circuit block is to operate. In one embodiment, the frequency control circuit 735 may be a clock multiplier circuit, while in another embodiment the frequency control circuit 735 may be a clock divider circuit. Generally speaking, frequency control circuit may be any suitable circuit for varying the frequency of the clock signal that is generated based on the received root clock signal, and may include both clock multipliers and dividers. The root clock signal may be generated within frequency control circuit 735 in some embodiments, using e.g., a ring oscillator, crystal oscillator, or other suitable clock generation circuit. However, embodiments where the root clock signal is generated elsewhere are also possible and contemplated.

Power management circuit 715 in the embodiment shown includes gating logic 733. Gating logic 733 may perform clock gating in response to receiving the Gate signal from state machine 731. This may occur, for example, when state machine 731 receives the GateClk signal from inhibit logic 722 of gate logic 710, in response to the detection of a voltage droop. Responsive to receiving the Gate signal, gating logic may inhibit all pulses of the clock until such time that the Gate signal is de-asserted.

In addition to performing clock gating (throttling), gate logic 733 may also dither the clock signal, e.g., selectively inhibit some (but not all pulses) to reduce the duty cycle of the clock signal as well as reducing its effective frequency. This may occur, for example, when state machine 731 receives the Threshold Reached signal from a first control loop, indicating that a particular temperature threshold has been reached. In response to receiving the Threshold Reached signal, state machine 731 may correspondingly assert the Dither signal. This dithering may be performed partially independent of the output from UVD circuit 700. That is, if state machine 731 receives the Threshold Reached signal from the first control loop, but no voltage droop has been detected by UVD circuit 700, dithering is performed. However, if a voltage droop is detected by UVD circuit 700, even when dithering is in progress, state machine 731 may assert the Gate signal and de-assert the Dither signal, thereby causing full clock gating to be carried out instead of dithering.

State machine 731 in the embodiment shown may include a number of logic circuits, both sequential and combinational, configured to determine respective performance states of one or more functional circuit blocks, clock gating actions, and other power control actions. State machine 731 in this example is coupled to UVD circuit 700 via the GateClk signal, reset signals (to the counters), count value signals (received from the counters), and an inhibit signal (to inhibit logic 722). As noted above, the GateClk signal may be asserted responsive to a supply voltage droop as indicated by the supply voltage falling below a first voltage threshold for a sufficient time to pass through filter 718, and may remain asserted until it has risen to a level equal to or above a second voltage threshold.

Using the count values received from counters 708 and 709, state machine 731 may determine how often the first and second threshold voltages were crossed during a predetermined time period, and may cause changes to the performance state if the number of crossings exceeds a predetermined value. The predetermined value may, in some cases, depend on the current performance state of a functional circuit block, such as a CPU, GPU, sub-unit thereof, and so on. When the predetermined time period has elapsed, state machine 731 may assert the reset signals, thereby resetting counters 708 and 709.

State machine 731 in the embodiment shown may also provide digital values indicative of thresholds to be used for particular performance states. As noted elsewhere, many ICs and functional circuits therein may operate in a number of different performance states that can be defined by a particular combination of clock frequency and supply voltage. When a performance state change results in a corresponding change of the supply voltage, state machine 731 may provide updated voltage thresholds to DACs 702 and 703.

In some embodiments, state machine 731 may receive indications of performance state changes from a source outside of power management circuit 715. However, embodiments are also possible and contemplated in which state machine 731 is the controlling actor in determining the performance state of a particular functional circuit block. Furthermore, although not explicitly shown here, power management circuit 715 may include some form of voltage control circuitry used to control the desired output voltages of various power supplies on the IC. For example, in response to commands from state machine 731, such voltage control circuitry could adjust a reference voltage provided to a particular power supply circuit, which may respond by a corresponding adjustment to its output supply voltage.

Descriptions of the various embodiments of the first and second control loop are provided here by way of example. These examples are not intended to be limiting, and thus, other embodiments of a thermal control system falling within the scope of the claims presented below are possible and contemplated.

Figure 8:
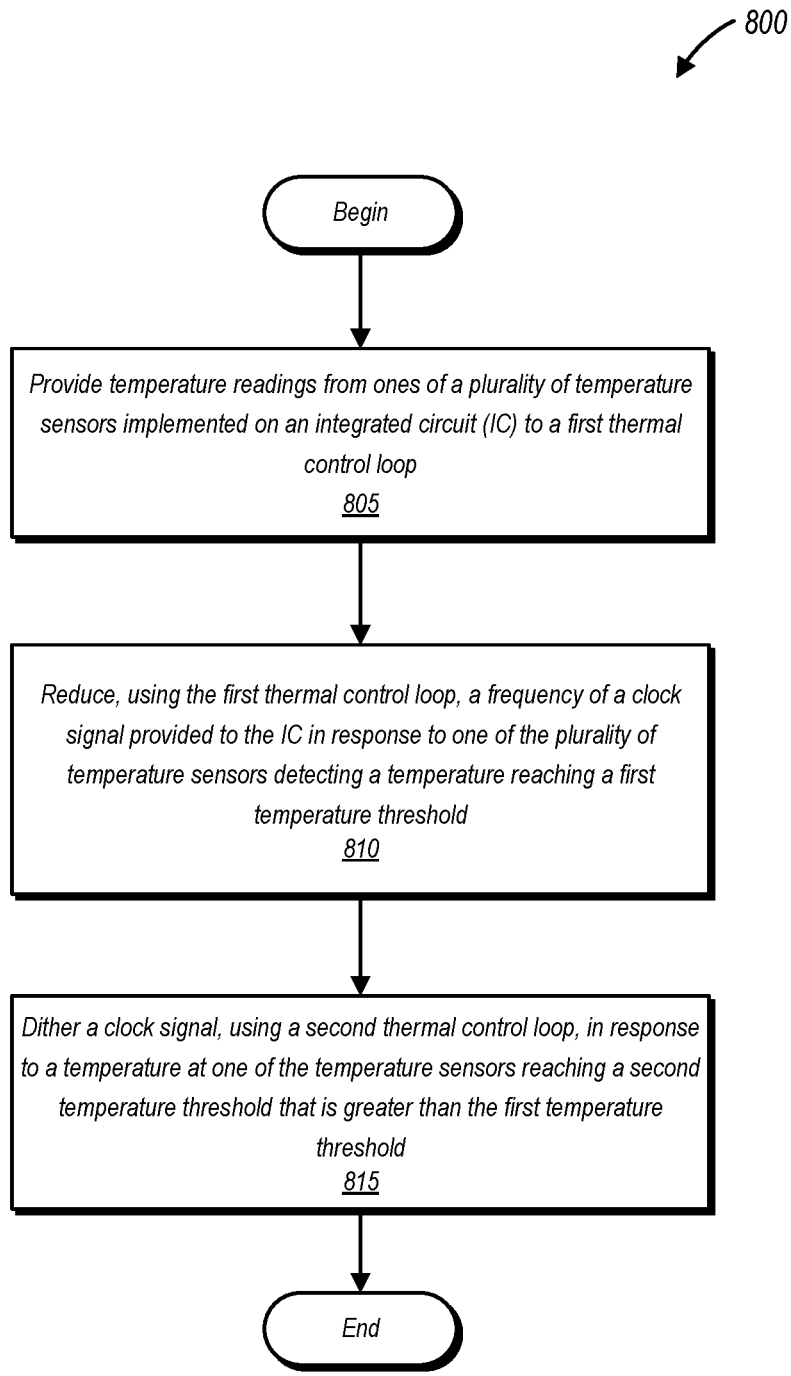
FIG. 8 is a flow diagram of one embodiment of a method for operating a thermal control system.

Methods for Use in Embodiments of a Thermal Control System:

FIG. 8 is a flow diagram of one embodiment of a method for operating a thermal control system having more than one thermal control loop. Method 800 may be carried out by any of the various embodiments of a thermal control system as discussed above. Embodiments of a thermal control system not explicitly disclosed herein but otherwise capable of performing Method 800 are also considered to fall within the scope of this disclosure.

Method 800 includes providing temperature readings from ones of a plurality of temperature sensors implemented on an integrated circuit (IC) to a first thermal control loop (block 805). The method further includes reducing, using the first thermal control loop, a frequency of a clock signal provided to the IC in response to one of the plurality of temperature sensors detecting a temperature reaching a first temperature threshold (block 810). The method also includes dithering a clock signal, using a second thermal control loop, in response to a temperature at one of the temperature sensors reaching a second temperature threshold that is greater than the first temperature threshold (block 815).

In various embodiments, the first temperature threshold comprises a temperature value and a guardband. In such embodiments, the method further includes determining the guardband based on a temperature detected at a particular one of the plurality of temperature sensors and a temperature at a designated hotspot on the integrated circuit during operation in a maximum expected workload condition, wherein the particular one of the plurality of temperature sensors is physically closer to the designated hotspot than other ones of the plurality of temperature sensors.

Embodiments of the method are also contemplated that include comparing temperature readings received from ones of the plurality of sensors to ones of a plurality of thresholds, the plurality of thresholds including the first and second thresholds, and wherein ones of the plurality of thresholds include a specified temperature value and a corresponding offset based on the guardband. Such embodiments further include generating a proportional error signal based on the comparing, generating an integral error signal based on the comparing and generating a control output signal based on summing the proportional and integral error signals.

The disclosure also contemplates embodiments of the method that include the second thermal control loop gating the clock signal for an amount of time (sometimes referred to as "throttling" the clock signal) in response to detecting a droop in a supply voltage distributed on the IC. The amount of time the clock signal is gated may be determined based on the time at which the supply voltage recovers to within specified limits.

Embodiments of the method are also contemplated which include the first thermal control loop initiating a reset of the IC in response to receiving an indication that a temperature at one of the plurality of temperature sensors has reached a third temperature threshold that is greater than the second temperature threshold. Such embodiments of the method may also include the first thermal control loop initiating a reduction of an operating voltage in the IC in response to receiving an indication that a temperature at one of the plurality of temperature sensors has reached a fourth temperature value that is greater than the second temperature threshold and less than the third temperature threshold.

Figure 9:
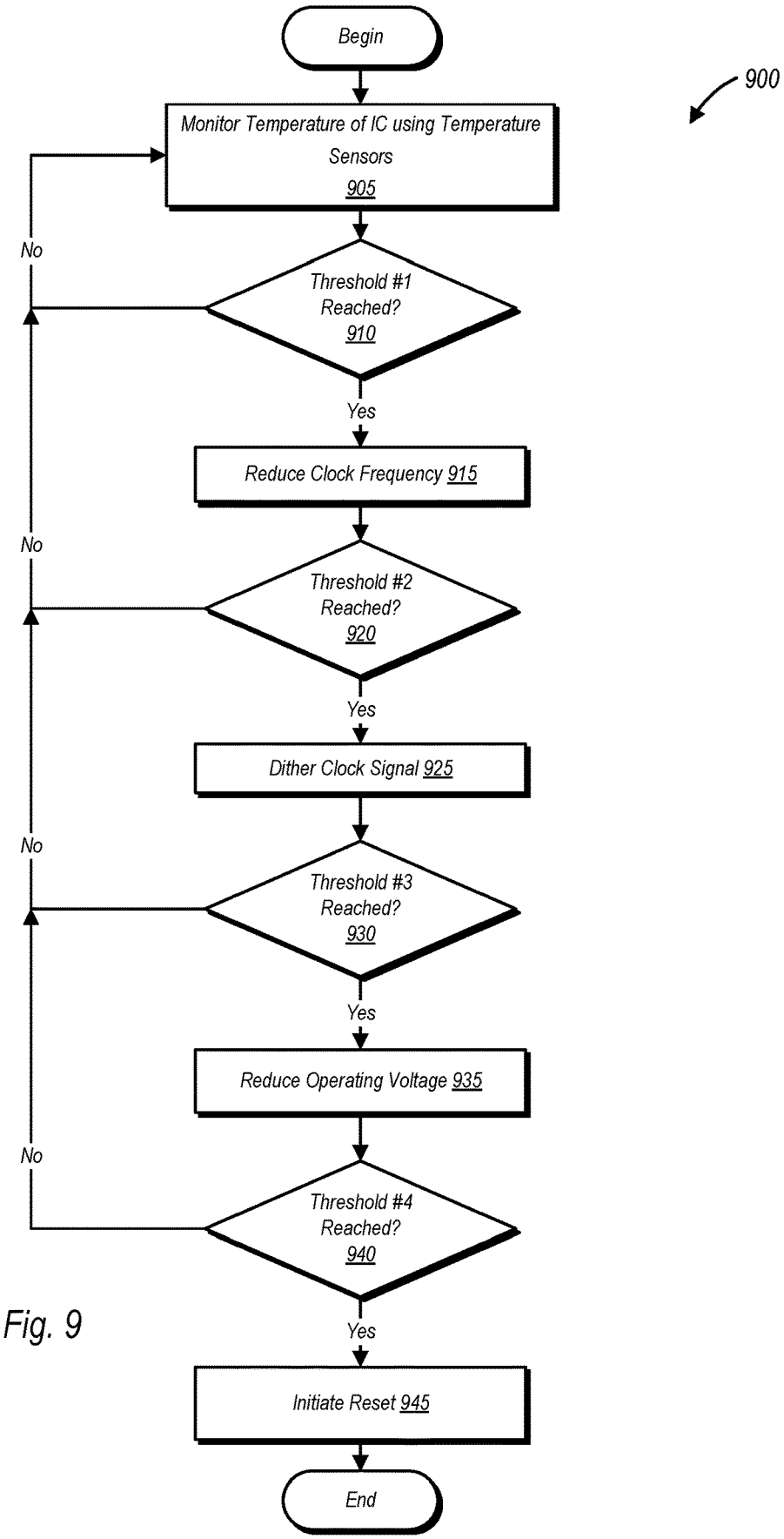
FIG. 9 is a flow diagram of another embodiment of a method for operating a thermal control system.

FIG. 9 is another block diagram illustrating an embodiment of a method for operating a thermal control system. Method 900 may be carried out by any of the various embodiments of a thermal control system as discussed above. Embodiments of a thermal control system not explicitly disclosed herein but otherwise capable of performing Method 900 are also considered to fall within the scope of this disclosure.

Method 900 includes monitoring of temperature of an integrated circuit using temperature sensors (block 905). The method further includes determining if a first temperature threshold has been reached (block 910). If the first threshold has not been reached (block 910, no), then no temperature control actions are taken, and the monitoring of temperatures continues at block 905. If the first threshold has been reached (block 910, yes), the frequency of a clock signal is reduced (block 915). The clock signal may be a global clock signal, or a clock signal that is local to a particular area close to or including the temperature sensor (s) that reported a temperature value meeting or exceeding the first temperature threshold.

The method continues with determining if a second temperature threshold has been reached (block 920). The second threshold may be of a higher temperature than the first threshold. If the second threshold has not been reach (block 920, no), no further temperature control actions are taken. If the second threshold has been reached (block 920, yes), the thermal control system performs dithering of the clock signal (block 925) in which some pulses of the clock signal are "swallowed" or otherwise inhibited, thereby reducing the effective frequency of the clock signal.

Method 900 continues with determining whether a third temperature threshold has been reached (block 930). The third threshold may be of a greater temperature than the first or second thresholds. If the third threshold has not been reached (block 930, no), no further temperature control actions are taken. If the third temperature threshold has been reached (block 930, yes), an operating voltage is reduced (block 935). The reduction in operating voltage may be applied globally, or may apply to a particular portion of an IC that is closest too or includes the temperature sensor(s) from which a temperature reaching at least the third threshold was reported.

The method continues with determining if a fourth temperature threshold has been reached (block 940). The fourth temperature threshold may be greater than the first, second, or third thresholds. If the fourth temperature threshold has not been reached (block 940, no), no further temperature control actions are performed by the thermal control system. If the fourth temperature threshold has been reached (block 940, yes), a reset of the IC is initiated (block 945). Alternative embodiments in which the IC is completely shut down are also possible and contemplated. The reaching of the fourth temperature threshold may correspond to a determination that other temperature control actions have failed to maintain the operating temperature within safe limits, and that damage to the IC is imminent absent a reset or shutdown.

Figure 10:
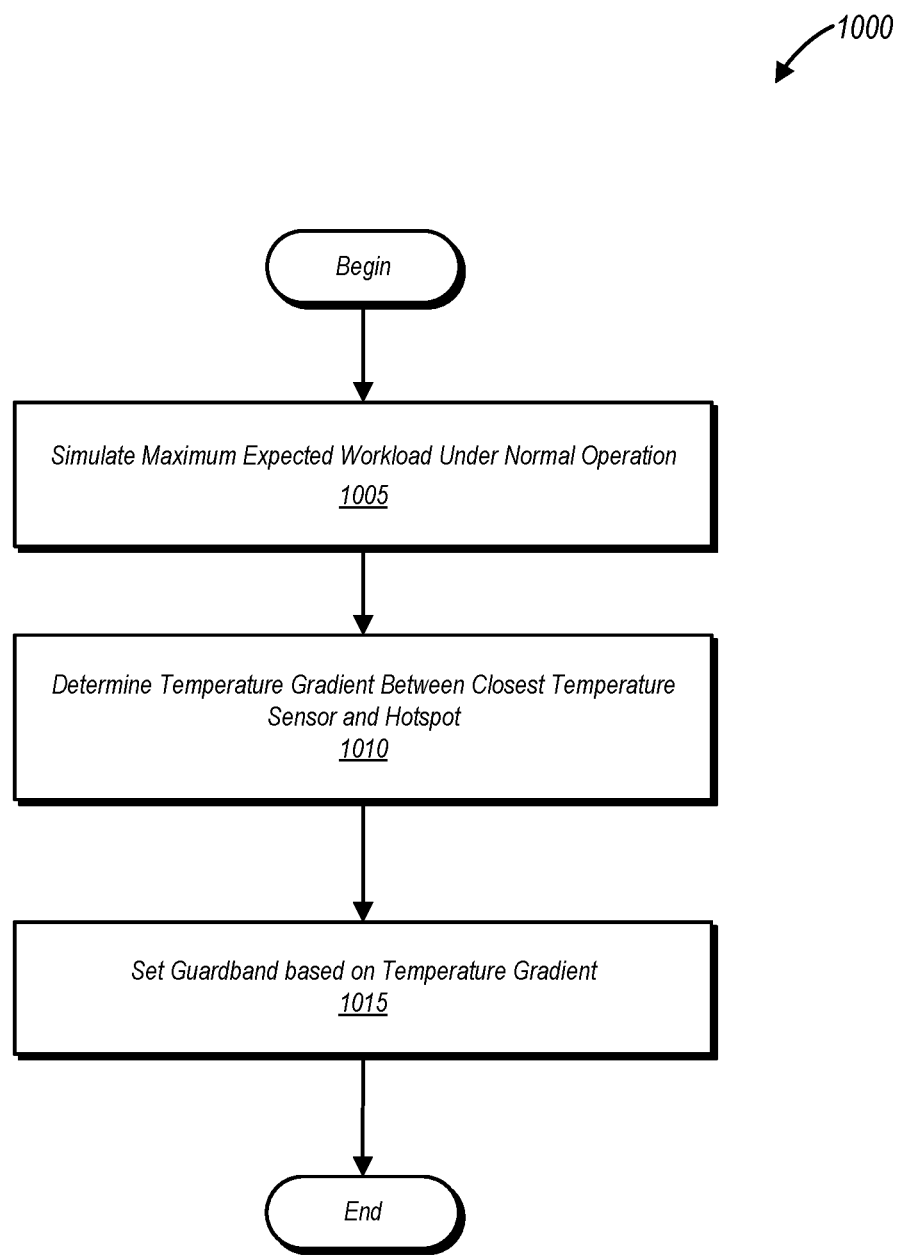
FIG. 10 is a flow diagram of one embodiment of a method for determining a guardband for at least one threshold in an embodiment of a thermal control system.

FIG. 10 is a flow diagram of one embodiment of a method for determining a guardband for a thermal control system. Method 1000 may be used to determine a guardband for a wide variety of thermal control systems, including (but not limited to) those discussed above.

Method 1000 includes simulating a maximum expected workload under normal operation (block 1005). The maximum expected workload may be a particular software application, thread, group of instructions, or other functionality that could be expected to be performed during normal operation of a system such as any of those discussed below with reference to FIG. 11 (although it is not limited to those examples). The maximum expected workload may further be a particular application that is processor intensive and thus pushes the performance limits of the particular system upon which it is executed.

Method 1000 continues with determining a temperature gradient between the closest temperature sensor and the hotspot (block 1010). The hotspot may be a designated area on an IC that is expected to produce a large amount of thermal energy in response to executing the maximum expected workload. For example, the hotspot may include one or more execution units in an execution pipeline of a processor, graphics processing circuitry, or other type. The temperature gradient may be based on a difference between the sensed temperature by a temperature sensor closest to the hotspot and the estimated actual temperature at the hotspot. The determined temperature gradient may be applied to the various on-chip temperature sensors based on their respective distances from a designated hotspot.

Based on determining the temperature gradient, a guardband may be set (block 1015). Setting the guardband based on the maximum expected workload, rather than a worst-case scenario (e.g., the execution of malicious code, such as a power virus, designed with the intent to cause overheating) may provide for a smaller guardband, and thus may allow for additional performance gains. Using the complementary thermal control loops in the thermal control systems discussed above may provide additional safeguards that allow for this smaller guardband and thus the added performance that may be obtained.

Figure 11:
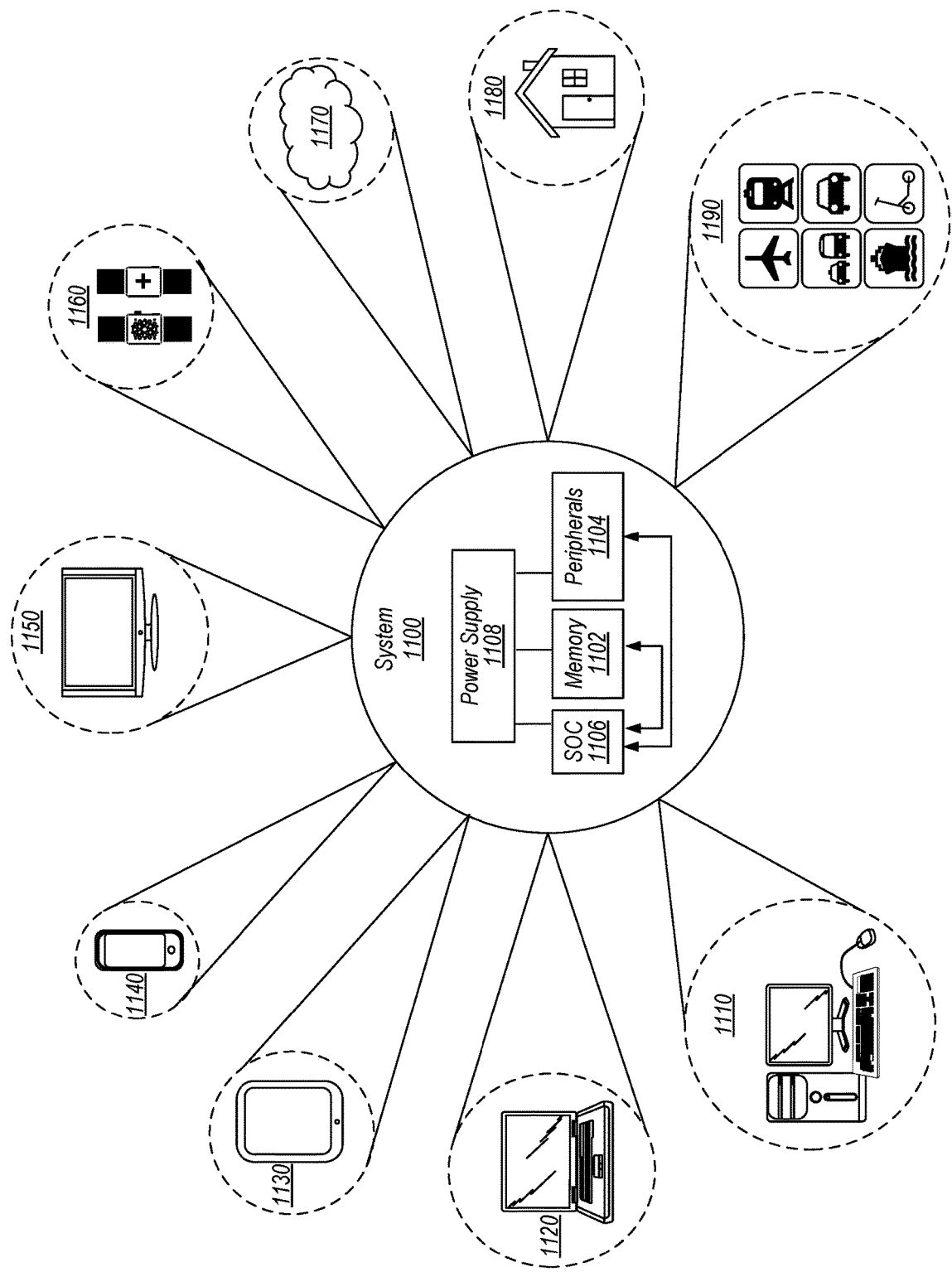
FIG. 11 is a block diagram of one embodiment of an example system.

Example System:

Turning next to FIG. 11, a block diagram of one embodiment of a system 500 is shown that may incorporate and/or otherwise utilize the methods and mechanisms described herein. In the illustrated embodiment, the system 1100 includes at least one instance of a system on chip (SoC) 1106 which may include multiple types of processing units, such as a central processing unit (CPU), a graphics processing unit (GPU), or otherwise, a communication fabric, and interfaces to memories and input/output devices. In some embodiments, one or more processors in SoC 1106 includes multiple execution lanes and an instruction issue queue. In various embodiments, SoC 1106 is coupled to external memory 1102, peripherals 1104, and power supply 1108. Various embodiments of the system shown in FIG. 11 may implement a thermal control system in accordance with the discussion above.

A power supply 1108 is also provided which supplies the supply voltages to SoC 1106 as well as one or more supply voltages to the memory 1102 and/or the peripherals 1104. In various embodiments, power supply 1108 represents a battery (e.g., a rechargeable battery in a smart phone, laptop or tablet computer, or other device). In some embodiments, more than one instance of SoC 1106 is included (and more than one external memory 1102 is included as well).

The memory 1102 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1104 include any desired circuitry, depending on the type of system 1100. For example, in one embodiment, peripherals 1104 includes devices for various types of wireless communication, such as Wi-Fi, Bluetooth, cellular, global positioning system, etc. In some embodiments, the peripherals 1104 also include additional storage, including RAM storage, solid state storage, or disk storage. The peripherals 1104 include user interface devices such as a display screen, including touch display screens or multi-touch display screens, keyboard or other input devices, microphones, speakers, etc.

As illustrated, system 1100 is shown to have application in a wide range of areas. For example, system 1100 may be utilized as part of the chips, circuitry, components, etc., of a desktop computer 1110, laptop computer 1120, tablet computer 1130, cellular or mobile phone 1140, or television 1150 (or set-top box coupled to a television). Also illustrated is a smartwatch and health monitoring device 1160. In some embodiments, smartwatch 1160 may include a variety of general-purpose computing related functions. For example, smartwatch 1160 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1100 may further be used as part of a cloud-based service(s) 1170. For example, the previously mentioned devices, and/or other devices, may access computing resources in the cloud (i.e., remotely located hardware and/or software resources). Still further, system 1100 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 1100 to various modes of transportation. For example, system 1100 may be used in the control and/or entertainment systems of aircraft, trains, buses, cars for hire, private automobiles, waterborne vessels from private boats to cruise liners, scooters (for rent or owned), and so on. In various cases, system 1100 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure Le something physical). More specifically, this formulation is used to indicate that this structure is arranged to perform the one or more tasks during operation. A structure can be said to be "configured to" perform some task even if the structure is not currently being operated. Thus, an entity, described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   an integrated circuit (IC) that includes a plurality of temperature sensors;
   a first thermal control loop configured to control temperature of the IC by reducing a frequency of a clock signal provided to the IC in response to a temperature at one of the plurality of temperature sensors reaching a first temperature threshold, wherein the first temperature threshold includes a temperature value and a guardband, wherein the guardband is determined based on a temperature detected at a particular one of the plurality of temperature sensors and a temperature at a designated hotspot on the integrated circuit during operation in a designated normal workload condition; and
   a second thermal control loop configured to control temperature of the IC by dithering the frequency of the clock signal provided to the IC in response to a temperature at one of the plurality of temperature sensors reaching a second temperature threshold that is greater than the first temperature threshold.

2. The apparatus of claim 1, wherein the second thermal control loop is configured to dither the clock signal in response to receiving an indication from the first thermal control loop that the one of the plurality of temperature sensors has reached the second temperature threshold.

3. The apparatus of claim 1, wherein the particular one of the plurality of temperature sensors is physically closer to the designated hotspot than other ones of the plurality of temperature sensors.

4. The apparatus of claim 1, wherein the designated normal workload condition is a maximum expected normal workload.

5. The apparatus of claim 1, wherein the first thermal control loop is configured to initiate a reset of the IC in response to receiving an indication that a temperature at one of the plurality of temperature sensors has reached a third temperature threshold that is greater than the second temperature threshold.

6. The apparatus of claim 5, wherein the first thermal control loop is configured to initiate a reduction of an operating voltage in the IC in response to receiving an indication that a temperature at one of the plurality of temperature sensors has reached a fourth temperature value that is greater than the second temperature threshold and less than the third temperature threshold.

7. The apparatus of claim 1, wherein the second thermal control loop is further configured to gate the clock signal for an amount of time in response to detecting a droop in a supply voltage provided to the IC.

8. A method comprising:
   providing temperature readings from ones of a plurality of temperature sensors implemented on an integrated circuit (IC) to a first thermal control loop;
   reducing, using the first thermal control loop, a frequency of a clock signal provided to the IC in response to one of the plurality of temperature sensors detecting a temperature reaching a first temperature threshold, wherein the first temperature threshold comprises a temperature value and a guardband, and wherein the method further comprises determining the guardband based on a temperature detected at a particular one of the plurality of temperature sensors and a temperature at a designated hotspot on the integrated circuit during operation in a maximum expected workload condition; and
   dithering the frequency a clock signal, using a second thermal control loop, in response to a temperature at one of the temperature sensors reaching a second temperature threshold that is greater than the first temperature threshold.

9. The method of claim 8, wherein the particular one of the plurality of temperature sensors is physically closer to the designated hotspot than other ones of the plurality of temperature sensors.

10. The method of claim 9, further comprising:
    comparing temperature readings received from ones of the plurality of sensors to ones of a plurality of thresholds, the plurality of thresholds including the first and second thresholds, and wherein ones of the plurality of thresholds include a specified temperature value and a corresponding offset based on the guardband;
    generating a proportional error signal based on the comparing;
    generating an integral error signal based on the comparing; and
    generating a control output signal based on summing the proportional and integral error signals.

11. The method of claim 8, further comprising the second thermal control loop gating the clock signal for an amount of time in response to detecting a droop in a supply voltage distributed on the IC.

12. The method of claim 8, further comprising the first thermal control loop initiating a reset of the IC in response to receiving an indication that a temperature at one of the plurality of temperature sensors has reached a third temperature threshold that is greater than the second temperature threshold.

13. The method of claim 12, further comprising the first thermal control loop initiating a reduction of an operating voltage in the IC in response to receiving an indication that a temperature at one of the plurality of temperature sensors has reached a fourth temperature value that is greater than the second temperature threshold and less than the third temperature threshold.

14. A system comprising:
a plurality of temperature sensors implemented on an integrated circuit (IC);
a first control loop configured to receive temperature readings from ones of the plurality of temperature sensors, and further configured to:
compare the temperature readings received from ones of the plurality of temperature sensors to a plurality of temperature thresholds including a first temperature threshold, wherein the first temperature threshold includes a temperature value and a guardband determined based on a temperature detected at a particular one of the plurality of temperature sensors and a temperature at a designated hotspot on the integrated circuit during operation in a designated normal workload condition;
reduce a frequency of a clock signal provided by the integrated circuit in response to one of the plurality of temperature sensors indicating a temperature that has reached the first temperature threshold;
a second control loop configured to monitor a supply voltage distributed on the integrated circuit and further configured to:
dither the frequency of the clock signal in response to receiving an indication from the first control loop of a temperature reading reaching a second temperature threshold greater than the first temperature threshold;
gate the clock signal for an amount of time in response to detecting that the supply voltage has fallen below a voltage threshold value.

15. The system of claim 14, wherein the designated normal workload condition comprises a maximum expected workload.

16. The system of claim 14, wherein the first control loop is further configured to cause a reset of the IC in response to receiving a temperature reading indicative of a temperature that is at least a third temperature threshold, wherein the third temperature threshold is greater than the second temperature threshold.

17. The system of claim 16, wherein the first control loop is configured to initiate a reduction in the supply voltage in response receiving a temperature reading that is at least a fourth temperature threshold, wherein the fourth temperature threshold is greater than the second temperature threshold and less than the third temperature threshold.

18. The system of claim 14, wherein the system includes a power management processor, wherein the power management processor comprises at least a portion of the first control loop.

19. The system of claim 14, wherein the first control loop is configured to generate proportional and integral error signals based on comparing temperature readings received from one or more of the plurality of temperature sensors to ones of the plurality of thresholds, and further configured to generate one or more temperature control signals based on the proportional and integral error signals.

20. The apparatus of claim 1, wherein the first thermal control loop is further configured to:
generate proportional and integral error signals based on comparisons of temperature values receive from at least one of the plurality of temperature sensors to ones of a plurality of thresholds, the plurality of thresholds including the first and second thresholds; and
generate one or more temperature control signals based on the proportional and integral error signals.

* * * * *